United States Patent
Jain et al.

(10) Patent No.: US 10,033,623 B2
(45) Date of Patent: Jul. 24, 2018

(54) MULTITHREADED SYSTEM AND METHOD FOR ESTABLISHING NETWORK CONNECTIONS

(71) Applicants: Ankur Jain, Gurgaon (IN); Deepinder Gill, Brampton (CA); Nigel Robert Davis, Edgware (GB); Amal Karboubi, Oshawa (CA)

(72) Inventors: Ankur Jain, Gurgaon (IN); Deepinder Gill, Brampton (CA); Nigel Robert Davis, Edgware (GB); Amal Karboubi, Oshawa (CA)

(73) Assignee: Ciena Corporation, Hanover, MD (US)

( * ) Notice: Subject to any disclaimer, the term of this patent is extended or adjusted under 35 U.S.C. 154(b) by 113 days.

(21) Appl. No.: 15/140,318

(22) Filed: Apr. 27, 2016

(65) Prior Publication Data

US 2017/0264529 A1    Sep. 14, 2017

(30) Foreign Application Priority Data

Mar. 9, 2016    (IN) .............................. 201611008271

(51) Int. Cl.
*H04L 12/751*    (2013.01)
*H04L 12/937*    (2013.01)
(Continued)

(52) U.S. Cl.
CPC .............. *H04L 45/02* (2013.01); *H04L 45/04* (2013.01); *H04L 45/64* (2013.01); *H04L 49/253* (2013.01); *H04L 67/2842* (2013.01)

(58) Field of Classification Search
CPC ..... H04W 84/00; H04W 40/00; H04W 40/02; H04W 40/04; H04W 40/246; H04W 40/248; H04W 76/00; H04W 76/02; H04W 76/022; H04W 76/027; H04W 76/10; H04W 76/11; H04W 76/15; H04L 12/2859; H04L 12/2872; H04L 12/46; H04L 12/4633; H04L 29/08576; H04L 29/06326; H04L 29/08009; H04L 29/0836; H04L 29/06537; H04L 29/06176; H04L 45/02; H04L 45/04; H04L 45/08; H04L 47/828; H04L 49/15; H04L 49/253

See application file for complete search history.

(56) References Cited

U.S. PATENT DOCUMENTS

| 6,381,237 B1 | 4/2002 | Lam et al. |
| 2008/0181608 A1* | 7/2008 | Parker ..................... H04L 49/35 398/52 |

(Continued)

*Primary Examiner* — Ashley Shivers
(74) *Attorney, Agent, or Firm* — Osha Liang LLP

(57) ABSTRACT

A method for connecting endpoints. The method may include determining, using a first group of software threads, cross-connection information regarding various cross-connections among various network elements. The network elements may include a first network element and a second network element. The method may further include determining, using the first group of software threads, link information regarding various links between the network elements. The method may further include processing, within a network cache, the cross-connection information and the link information into various network resources groups. Each network resource group of the network resources groups may describe adjacent cross-connections for a link among the links.

20 Claims, 9 Drawing Sheets

(51) Int. Cl.
*H04L 12/715* (2013.01)
*H04L 29/08* (2006.01)

(56) References Cited

U.S. PATENT DOCUMENTS

2015/0200838 A1* 7/2015 Nadeau ................. H04L 45/124
398/58
2016/0191370 A1* 6/2016 Wood ...................... H04L 45/02
370/238

* cited by examiner

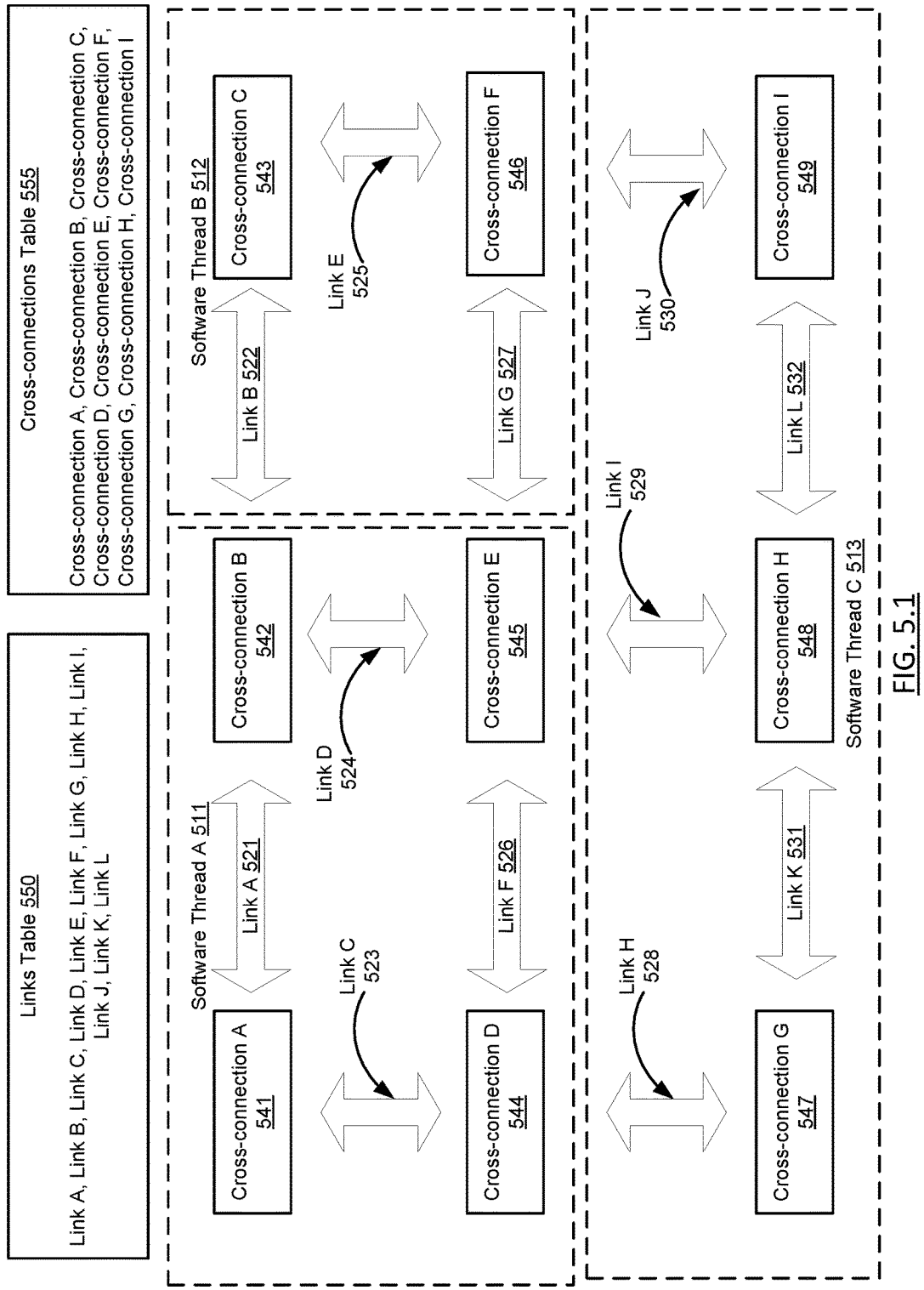
FIG. 5.1

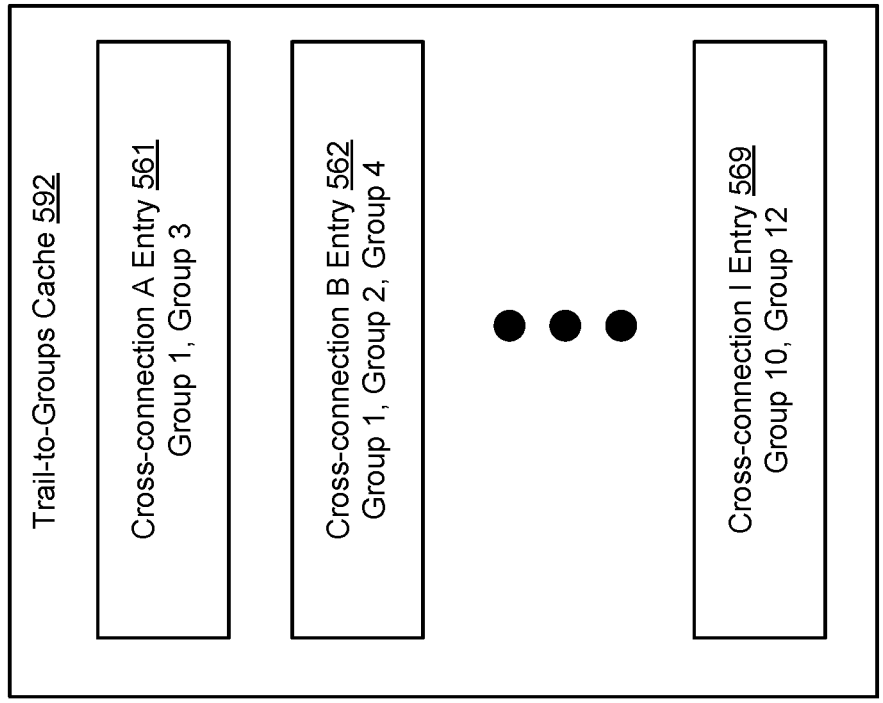
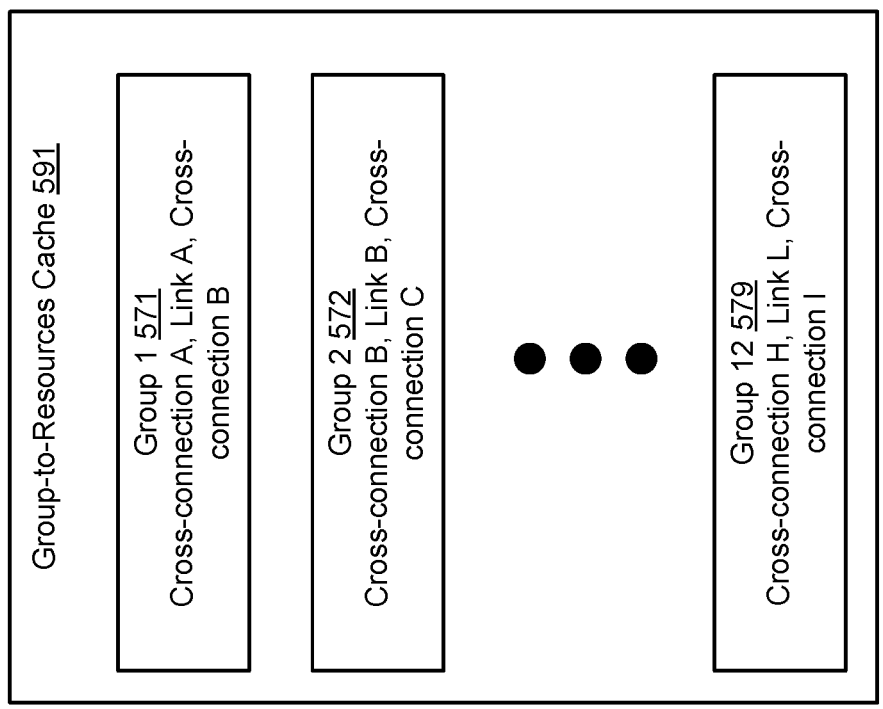
FIG. 5.2

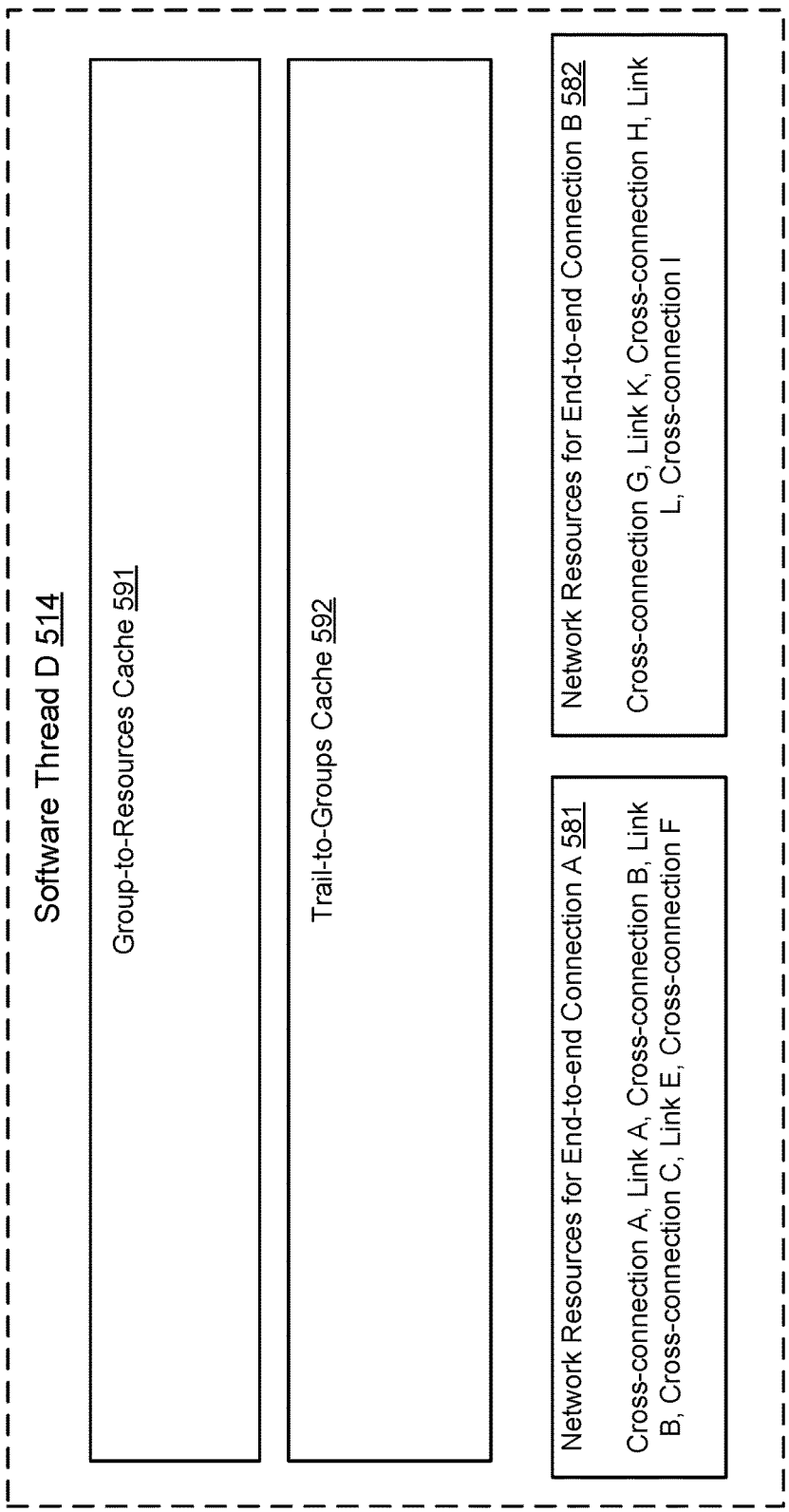
FIG. 5.3

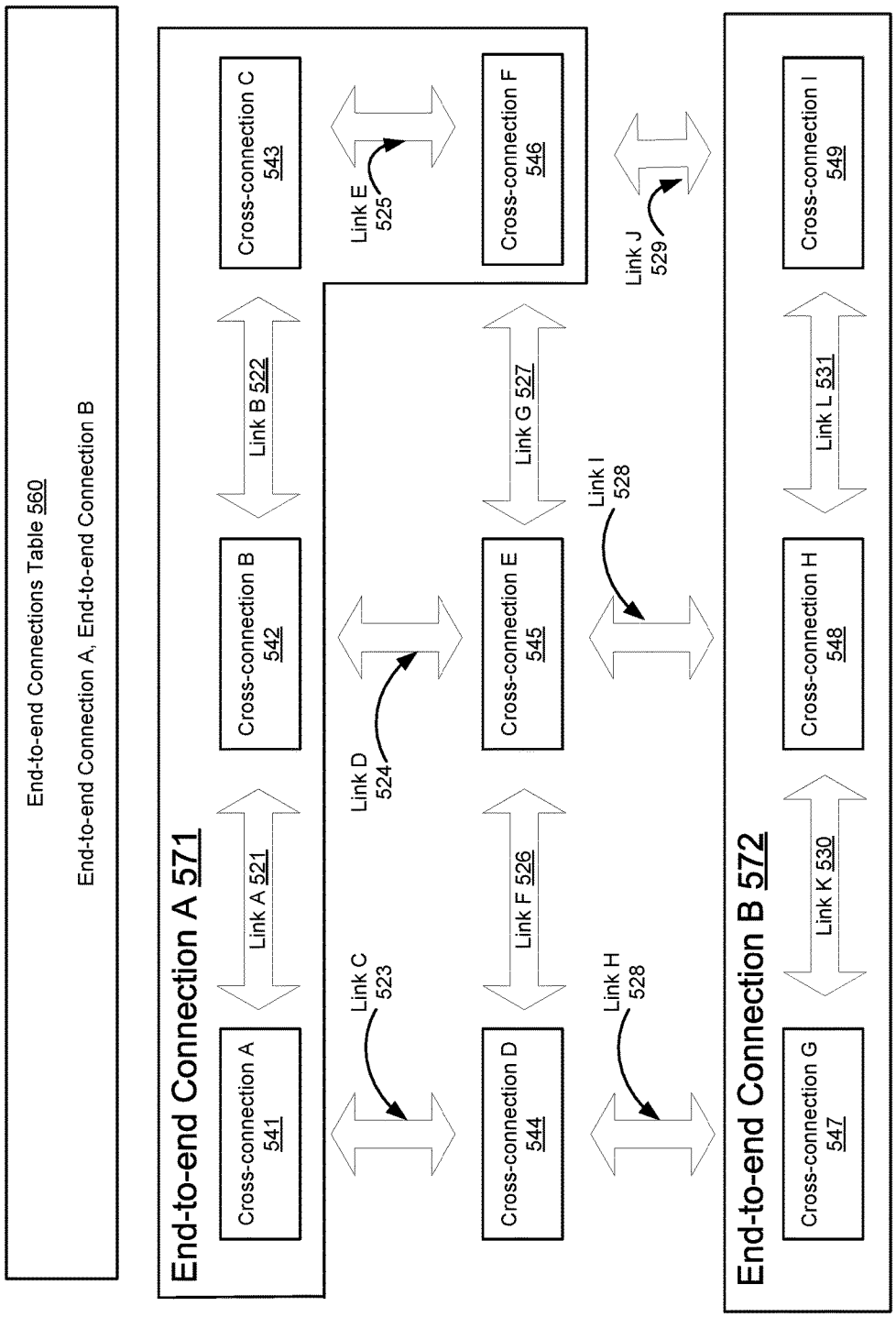
FIG. 5.4

MULTITHREADED SYSTEM AND METHOD FOR ESTABLISHING NETWORK CONNECTIONS

CROSS-REFERENCE TO RELATED APPLICATIONS

This application claims priority to Indian Patent Application Serial No. 20161100827, titled "MULTITHREADED SYSTEM AND METHOD FOR ESTABLISHING NETWORK CONNECTIONS," which was filed on Mar. 9, 2016, and is incorporated herein by reference.

BACKGROUND

Many different paths exist within many networks for establishing end-to-end connections. For example, a variety of different links and nodes may be used to communicate between a single node and a distant node within a network. These nodes and links may be included in a network map or routing table for managing communication with the network. As such, discovering and establishing network connections within the network may include a large start-up time to determine the initial data routes within the network as well as more time to actually implement the initial data routes.

SUMMARY

In general, in one aspect, the invention relates to a method for connecting endpoints. The method includes determining, using a first group of software threads, cross-connection information regarding various cross-connections among various network elements. The network elements include a first network element and a second network element. The method further includes determining, using the first group of software threads, link information regarding various links between the network elements. The method further includes processing, within a network cache, the cross-connection information and the link information into various network resources groups. Each network resource group of the network resources groups describes adjacent cross-connections for a link among the links.

In one or more embodiments, the method further includes identifying, using a software thread and the plurality of network resources groups, an end-to-end connection between the first network element and the second network element. In one or more embodiments, the method further includes establishing, using a second group of software threads, the end-to-end connection.

In general, in one aspect, the invention relates to a system for connecting endpoints. The system includes various network elements including a first network element, a second network element, and various cross-connections. The network elements are configured to communicate with a control plane for establishing various end-to-end connections between the network elements. The system further includes a software-defined network (SDN) controller. The SDN controller is configured to determine, using a first group of software threads, cross-connection information regarding various cross-connections among the network elements. The SDN controller is further configured to determine, using the first group of software threads, link information regarding various links between the network elements. The SDN controller is further configured to process, within a network cache, the cross-connection information and the link information into various network resources groups. Each network resource group of the network resources groups describes adjacent cross-connections for a link among the links.

In one or more embodiments, the SDN controller is further configured to identify, using a software thread and the plurality of network resources groups, a first end-to-end connection between the first network element and the second network element. In one or more embodiments, the SDN controller is further configured to establish, using a second group of software threads, the first end-to-end connection.

In general, in one aspect, the invention relates to a non-transitory computer readable medium (CRM) storing a plurality of instructions for connecting endpoints. The instructions include functionality for determining, using a first group of software threads, cross-connection information regarding various cross-connections among various network elements. The network elements include a first network element and a second network element. The instructions further include functionality for determining, using the first group of software threads, link information regarding various links between the network elements. The instructions further include functionality for processing, within a network cache, the cross-connection information and the link information into various network resources groups. Each network resource group of the network resources groups describes adjacent cross-connections for a link among the links.

In one or more embodiments, the instructions further include functionality for identifying, using a software thread and the plurality of network resources groups, an end-to-end connection between the first network element and the second network element. The instructions further include functionality for establishing, using a second group of software threads, the end-to-end connection.

Other aspects of the invention will be apparent from the following description and the appended claims.

BRIEF DESCRIPTION OF DRAWINGS

FIGS. 5.1, 5.2, 5.3, and 5.4 show an example in accordance with one or more embodiments.

DETAILED DESCRIPTION

Figure 1:
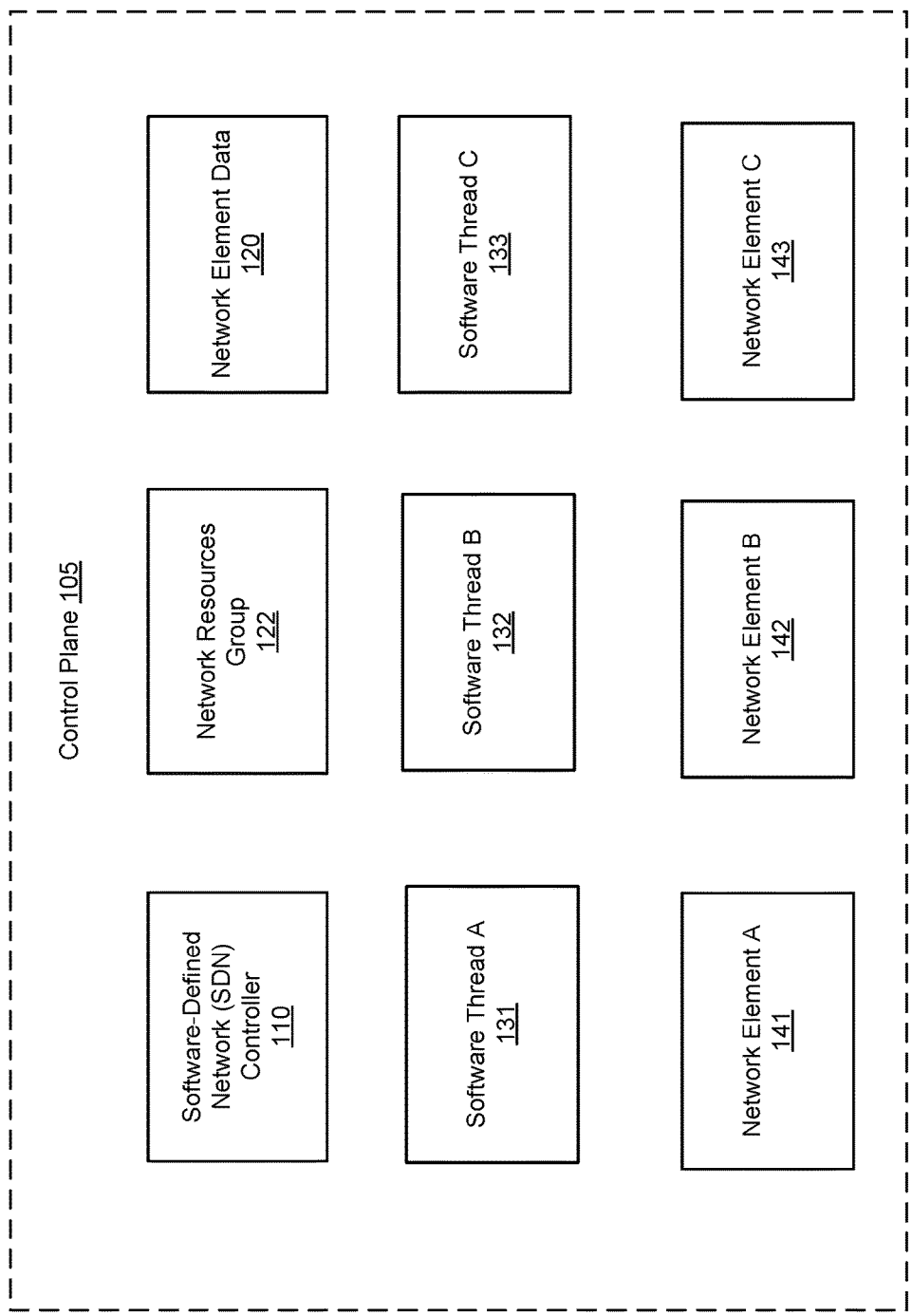
FIGS. 1 and 2 show systems in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a method, a system, and a non-transitory computer readable medium for connecting various endpoints. In particular, one or more embodiments are directed using various software threads to identify and establish end-to-end connections across a network. For example, a group of software threads may perform a data optimization process to discover various links and cross-connections within a network. In one or more embodiments, information regarding the links and cross-connections are processed into various network caches. Afterwards, a single software thread may be assigned to the task of stitching together various end-to-end connections using the information, i.e., an end-to-end connection may be composed of various network resources, such as cross-connections and links. Once the single software thread identifies the network resources, another group of software threads implement the end-to-end connection on the network.

FIG. 1 shows a block diagram for a control plane in accordance with one or more embodiments. In one or more embodiments, a control plane (105) as shown in FIG. 1 is part of a network architecture that includes hardware and/or software configured for routing data and establishing links and/or network connections between various network elements (e.g., network element A (141), network element B (142), and network element C (143)) within a network (not shown). In particular, a network element may refer to various components such as optical switches, routers, hubs or any other logical entities for uniting one or more physical devices on the network. Thus, the control plane (105) may monitor and manage various network services over the network by operating on the network elements (141, 142, 143). As such, the control plane (105) may implement a network topology for use by a data plane (not shown) for forwarding packets to endpoints over the network. In particular, the control plane (105) may implement the network topology using a routing table (not shown), e.g., for defining logical paths over the network for communicating data.

In one or more embodiments, the control plane (105) monitors and manages the network using various software threads (e.g., software thread A (131), software thread B (132), software thread C (133)). Specifically, a particular software thread may be assigned to perform a particular task with respect to the control plane (105). The software threads (131, 132, 133) may be implemented using a multi-core multi-platform environment, for example. For more information on software threads, see FIG. 2 and the accompanying description below.

In particular, the control plane (105) may collect network element data (120) by transmitting and obtaining various control packets between the network elements (141, 142, 143). Network element data (120) may include information relating to network elements within the network as well as any adjacency data regarding a particular network element, e.g., which network elements are in communication with the particular network element. For example, network element data may directly describe links and/or cross-connections within the network. On the other hand, network element data may indirectly describe cross-connections and/or links, such as merely describing the type and location of network elements.

In one or more embodiments, the control plane (105) includes a software-defined network (SDN) controller (110) for monitoring and administering the control plane (105). The SDN controller (110) may be implemented using hardware and/or software operating on one or more of the network elements (141, 142, 143). For example, the SDN controller (110) may use a set of application program interfaces (APIs) to communicate between the control plane (105) and an infrastructure layer (e.g., the physical network that includes the network elements (141, 142, 143)) and another set of APIs to communicate with various software applications operating in the application layer of the network. In one or more embodiments, the SDN controller (110) is "centralized," while being distributed across multiple platforms, e.g., network elements (141, 142, 143). As such, the SDN controller (110) may manage the network over the control plane (105) using various software threads (e.g., software thread A (131), software thread B (132), and software thread C (133)) on the multiple platforms.

Furthermore, the control plane (105) may collect network resource information regarding various network resources within the network. As such, the control plane (105) may store the network resource information into a network resources table (122). In particular, the network resource information may describe various network links established between various network elements within one or more networks as well as various cross-connections located within the one or more networks. In one or more embodiments, the network resources table (122) is located in one or more network caches. For example, the network resource information may include link information that describes which network elements form the link, e.g., the network elements that provide the endpoints for the link as well as any intervening links. Network resource information may also describe which links use a given cross-connection.

In one or more embodiments, the control plane (105) collects cross-connection information regarding various cross-connections within the network. In particular, a cross-connection (also called "cross-connect" or "XC") may describe a termination between network layers, i.e., a layer termination. In particular, cross-connection information may specify a routing interface for a network element where a particular link ends for one layer and a new link begins for communicating with another network element on a different layer. In one or more embodiments, multiple cross-connections are located on a single network element. In one or more embodiments, for example, a cross-connection is a device used by a telecommunication carrier to switch high-speed data signals. In particular, the cross-connection may be an optical cross-connect (OXC) within a fiber optic network, where the optical cross-connect is a termination of the optical layer. In another example, the cross-connection may be a digital cross-connect (DXC), e.g., a layer termination between low-speed digital data signals and high speed digital data signals.

Figure 2:
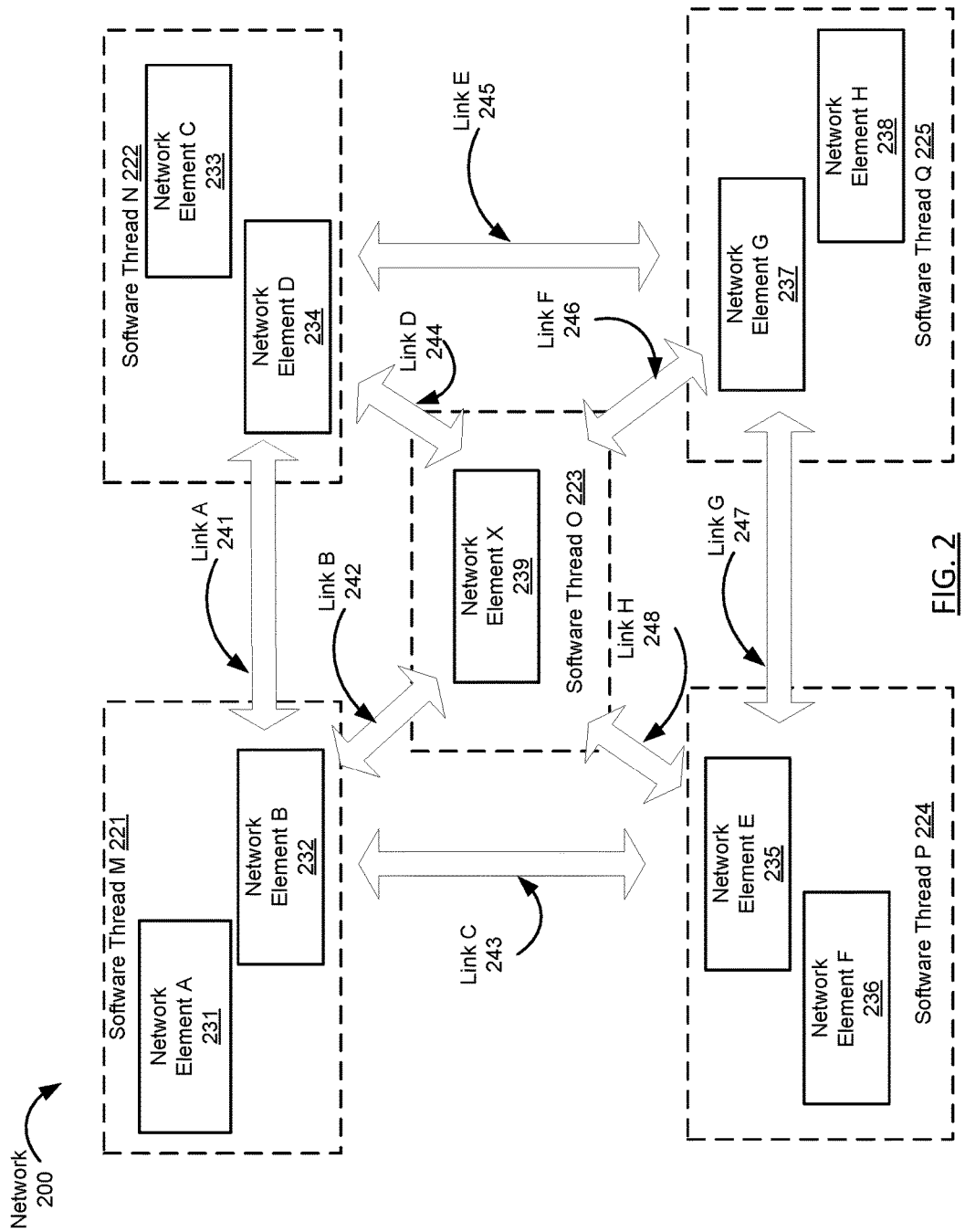

FIG. 2 shows a network in accordance with one or more embodiments. In one or more embodiments, the network (200) as shown in FIG. 2 includes various network elements (e.g., network element A (231), network element B (232), network element C (233), network element D (234), network element E (235), network element F (236), network element G (237), network element H (238), and network element X (239)) connected through various links (e.g., link A (241), link B (242), link C (243), link D (244), link E (245), link F (246), link G (247), and link H (248)). In one or more embodiments, various software threads (e.g., software thread M (221), software thread N (222), software thread O (223), software thread P (224), and software thread Q (225)) operate on the network elements (231-239) as shown in FIG. 2.

In one or more embodiments, a control plane (not shown) in the network (200) establishes various end-to-end connections between the network elements (231-239). An end-to-end connection is a logical path from a source endpoint, e.g. a network element, to a destination endpoint, e.g., another network element. Once an end-to-end connection has been established, the source endpoint may communicate over the network (200) with the destination endpoint. For example, an end-to-end connection may have network element E (235) as a source endpoint and network element D (234) as the destination endpoint. As such, various logical paths may be selected to establish the end-to-end connection between the two network elements, such as, for example, link C (243), network element B (232), and link A (241).

In one or more embodiments, the software threads (221-225) are individual program segments operating independently of each other over the network (200). In particular, a software thread may include various software instructions executable by a computer processing unit located on one of the network elements (231-239). For example, software thread M (221) is shown operating on network element A (231) and network element B (232). While software thread M (221) may be physically running on only one of network element A (231) or network element B (232), the software thread M (221) may be collecting network element data on both network elements (231, 232). Furthermore, software thread M (221) may also monitor adjacent network elements over the network (200), e.g. with respect to link A (241), link B (242), and link C (243).

In one or more embodiments, one or more of the software threads (221-225) are assigned a particular task by a control plane (not shown) in the network (200). Specifically, various software threads may be assigned to collect network element data across the network (200). In one or more embodiments, one of the software threads (221-225) is assigned the task of determining end-to-end connections across the network. In one or more embodiments, one or more of the software threads (221-225) is assigned the task of establishing an end-to-end connection over the network (200).

Figure 3:
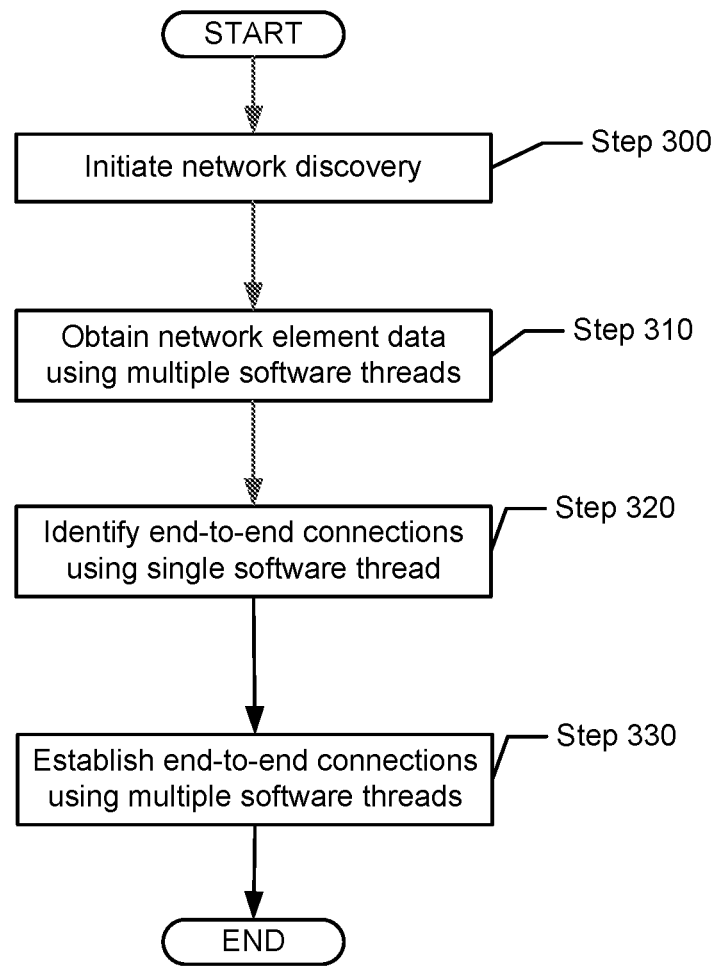
FIGS. 3 and 4 show flowcharts in accordance with one or more embodiments.

FIG. 3 shows a flowchart in accordance with one or more embodiments. Specifically, the process depicted in FIG. 3 may be performed by the SDN controller and/or various software threads as described in FIGS. 1 and 2. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, network discovery is initiated in accordance with one or more embodiments. Specifically, an SDN controller may initiate network discovery regarding new and/or unconnected network elements within a network. Furthermore, the SDN controller may initiate network discovery upon the network coming online. The SDN controller may, for example, start broadcasting control messages throughout the control plane during the initial deployment of the network or in regard to an under-analyzed area of the network, e.g., resulting from a transition to a new management solution or from an ad-hoc managed environment to an SDN controlled environment.

In Step 310, network element data are obtained using multiple software threads in accordance with one or more embodiments. In one or more embodiments, for example, individual software threads operate on respective network elements and collect network information on the respective network element. On the other hand, software threads may be located on a single device within a network, and may transmit and receive messages over a control plane from the single device to obtain network element data. In particular, software threads may obtain network element data actively by transmitting control messages across a control plane. In one or more embodiments, a particular software thread is assigned, e.g., by an SDN controller, a group of networks elements within a network. Thus, the particular software thread may gather network element data for the group of network elements. In one or more embodiments, the multiple software threads are implemented using all computer processing unit (CPU) cores that form part of the control plane.

In Step 320, various end-to-end connections are identified using a single software thread in accordance with one or more embodiments. In one or more embodiments, the single software thread obtains network element data throughout a network. Using the network element data, the single software thread may identify a group of network resources within the network that may form an end-to-end connection. For example, the network resources may include a list of links and cross-connections that define a logical path between one endpoint and another endpoint. As such, in one or more embodiments, the single software thread may generate a list of network resources that describe various end-to-end connections within the network.

In Step 330, various end-to-end connections are established using multiple software threads in accordance with one or more embodiments. In one or more embodiments, for example, the software threads establish end-to-end connections over the control plane using network resources identified in Step 320. Specifically, a group of software threads may be designated for establishing an end-to-end connection. Thus, different members of the group may administer different network elements within the logical path to establish the end-to-end connection.

In one or more embodiments, Step 330 occurs simultaneously with Step 320. For example, once the single software thread in Step 320 identifies a group of network resources for a particular end-to-end connection, the multiple software threads may obtain information regarding the group of network resources. While the single software thread is identifying another end-to-end connection, the multiple software threads may implement the previously identified end-to-end connection, accordingly.

Figure 4:
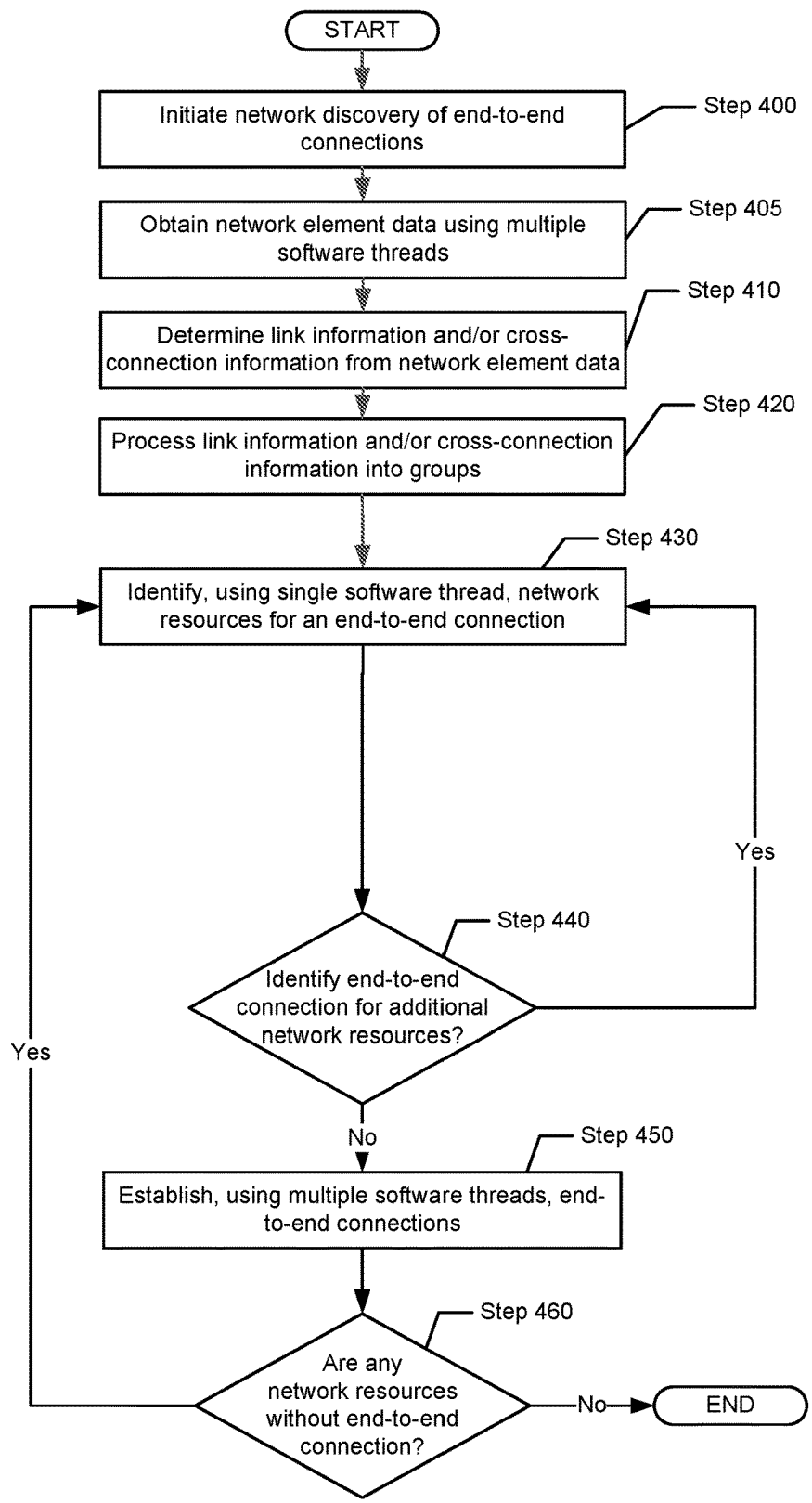

FIG. 4 shows a flowchart in accordance with one or more embodiments. Specifically, one or more steps in FIG. 4 may be performed by the SDN controller and/or various software threads as described in FIGS. 1 and 2. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, network discovery of end-to-end connections is initiated in accordance with one or more embodiments. In one or more embodiments, Steps 405-460 of the process described in FIG. 4 occur before a data plane is implemented by a control plane on a network. For example, Step 400 may occur during the initial start-up phase of a network before a route table has been established by the control plane. When a network comes online, various network elements may begin communicating with each other as well as communicating with an SDN controller.

In Step 405, network element data is obtained using multiple software threads in accordance with one or more embodiments. Specifically, Step 405 may be performed similar to Step 310 described above.

In Step 410, link information and/or cross-connection information is determined from network element data in accordance with one or more embodiments. Specifically, the network element data from Step 405 may describe various links between network elements within the network. As such, the network element data may be obtained from broadcast messages transmitted over a control plane and from any corresponding acknowledgments. On the other hand, the network element data from Step 405 may directly describe various cross-connections within the network.

In one or more embodiments, for example, an SDN controller obtains the network element data from Step 405 and determines various links and cross-connections within a network accordingly. Also, various software threads operating throughout a control plane may also determine various links and cross-connections throughout the network, while transmitting information on the links and cross-connections to the SDN controller.

In Step 420, link information and/or cross-connection information is processed in accordance with one or more embodiments. Specifically, the link information and/or cross-connection information obtained either directly or indirectly by the multiple software threads may be organized into a central location available to be accessed by a single software thread. Thus, in one or more embodiments, the link information and/or cross-connection information is aggregated in a predetermined format, e.g., a network resources table, to match network resources on adjacent nodes. This matching of network resources may be performed in parallel by multiple software threads.

In one or more embodiments, link information and/or cross-connection information is processed using one or more network caches. Specifically, link information and/or cross-connection information may be stored as cache data in one or more databases that are accessible by network elements or an SDN controller within a control plane. A network cache may be accessed by a control plane, for example. In one or more embodiments, links and associated cross-connections are assigned to various groups together in Step 420. In particular, each group may have a group identifier for placement within a group cache (also called a "Group-To-Resources cache") according to a group identifier. Thus, a key within the group cache may be the group identifier, while the values within an entry in the group cache are the network resources, e.g., links and cross-connections. In one or more embodiments, links and associated cross-connections are assigned to a group based on various network parameters, such as a type of network protocol and/or network layer, a channel identification, and/or flow identification. As such, one or more network caches may be used to index links within one or more networks to a particular cross-connection.

In one or more embodiments, the link information and/or the cross-connection information may be stored in a network resources table as described in FIG. 1. In one or more embodiments, a network map of the network is generated from the link information and/or cross-connection information.

In one or more embodiments, cross-connection information is placed within a cross-connections cache (also called a "trail-to-groups cache"). Specifically, when a cross-connection is identified within a network from the cross-connection information obtained in Step 410, an entry may be made in the cross-connection cache. The entry may include a cross-connection identifier for the particular cross-connection, while an entry may be made for each cross-connection in the network. The values within the cross-connections cache may be the group identifiers that correspond to that particular cross-connection.

In one or more embodiments, Steps 430-440 below are directed to determining network resources for end-to-end connections. Furthermore, in one or more embodiments, Steps 450-460 below are directed to establishing the end-to-end connections. While determining and establishing end-to-end connections are described as separate iterations within FIG. 4, both processes may be performed in parallel to build and implement the routing table for a network. In one or more embodiments, for example, a single software thread may determine the end-to-end connection in Steps 430-440, and multiple software threads may then implement the same end-to-end connection. Thus, the single software thread may proceed to determine the next end-to-end connection after generating an entry for the previous end-to-end connection that multiple software threads may then implement.

In Step 430, various network resources are identified for an end-to-end connection using a single software thread in accordance with one or more embodiments. Network resources may include links, cross-connections, other network elements, etc. Specifically, the single software thread may determine the cross-connections and/or links for the end-to-end connection using one or more network caches as describes in Step 420. As such, in one or more embodiments, the single software thread adds an entry for the end-to-end connection to a table describing the network resources for each end-to-end connection in a network. In one or more embodiments, the single software thread may use the group cache and/or the cross-connection cache described in Step 420 to determine the end-to-end connection. In one or more embodiments, a single identified cross-connection is assigned only to a single end-to-end connection using the group cache and/or the cross-connection cache.

In one or more embodiments, a network is divided into various network regions or chunks that are each assigned to a single software thread for identifying end-to-end connections within that network region. Thus, while the cross-connection and/or link information obtained in Steps 405-410 may be for the entire network, the single software thread may use the cross-connection information and/or link information only to determine end-to-end connections for the particular network region. As such, Step 430 may be extended to multiple software threads.

Furthermore, the network regions may correspond to various predetermined divisions assigned to the network. In one or more embodiments, for example, the network regions are allocated by the control plane during the initial network discovery phase. In one or more embodiments, the regions are determined after obtaining the cross-connection information and the link information for the network.

In Step 440, a determination is made whether to identify another end-to-end connection for additional network resources in accordance with one or more embodiments. When it is determined that a network resource, such as a cross-connection or a link lacks an entry for an end-to-end connection, the process may proceed to Step 430. When it is determined that network resources have been identified for each end-to-end connection, the process may proceed to Step 450.

In Step 450, various end-to-end connections are established using multiple software threads in accordance with one or more embodiments. In one or more embodiments, an entry from a network resources table is selected for establishing an end-to-end connection. In one or more embodiments, the multiple software threads are operated by a software-defined network controller located on subset of network elements within a network. The multiple software threads may transmit and receive messages over a control plane, for example, to prepare network elements, such as cross-connections, to implement the end-to-end connection.

In one or more embodiments, the establishment of the end-to-end connections in Step 450 is performed substantially simultaneously with the identification of end-to-end connections in Step 430. For example, after a single software thread has determined the network resources for a particular end-to-end connection, the multiple software threads in Step 450 may obtain the network resource information. Thus, the multiple software threads may proceed to establish the logical path using the cross-connections and links within the network, while the single software thread moves onto to identify another end-to-end connection.

In Step 460, a determination is made whether any network resources are without an end-to-end connection in accordance with one or more embodiments. Specifically, the SDN controller may determine whether an additional cross-connection is missing an entry in a routing table for the network. If the routing table is complete, then the SDN controller may determine that every network resource has an end-to-end connection. In one or more embodiments, the SDN controller searches a trail-to-groups cache to determine whether a cross-connection is missing an entry in the trail-to-groups cache. When it is determined that any network resources lack an end-to-end connection, the process proceeds to Step 430. When it is determined that end-to-end connections have been established for each network resource in the network, the process ends.

In one or more embodiments, the processes described in FIGS. 3-4 are applied to identifying service function chains within a network-function virtualization (NFV) system. In particular, rather than identifying end-to-end connections in Step 430, the single software thread may identify problem locations within a connectivity service. In one or more embodiments, for example, the single software thread identifies a shortest path between endpoints for an Ethernet network in Step 430, while the multiple software threads implement the shortest path in the Ethernet network in Step 450. Thus, the processes described in FIGS. 3-4 may reconstruct an Ethernet network with a shortest path tree.

While FIGS. 1-4 are described with respect to network elements and cross-connections, in one or more embodiments, the algorithm described in FIGS. 3-4 is applied to various layered system structures, such as data storage systems and other types of computing systems. In particular, Steps 405-420 may be replaced with steps to determine various system adjacencies within the layered system (e.g., how data is inserted within a hard disk). In one or more embodiments, for example, the cross-connections described in FIGS. 3-4 are replaced using the layer terminations within the layered system. Furthermore, Steps 430-460 may be replaced with establishing connections within the layered system where the interactions between functional components of the layered system are known.

In one or more embodiments, a method is performed using one or more steps from FIGS. 3-4. The method may include determining, using a group of software threads, cross-connection information regarding various cross-connections among various network elements. The network elements may include a first network element and a second network element. The method may further include determining, using the group of software threads, link information regarding various links between the network elements. The method may further includes processing, using the group of software threads, the cross-connection information and the link information into various network resources groups. Each network resource group of the network resources groups describes adjacent cross-connections for a link among the links. The adjacency between cross-connections may be determined by properties of the cross-connections. For example, the properties may include protocols, flow identifications, channel identifications, etc. The group of software threads may add the network resources groups to a network cache where the key is a group identifier and the values are the cross-connections of the group as well as information on other relevant resources. For example, entries in the network cache may be created and/or updated throughout the method. The method may further include using the group of software threads to augment an additional network cache with various entries. For example, each entry of the group corresponds to a respective cross-connection from the cross-connections in the network resource groups. Link information in the method may include at least a first port and a second port used by a link from various links. A port may correspond to various terminations of a network layer.

FIGS. 5.1-5.4 provides an example of establishing various end-to-end connections. The following example is for explanatory purposes only and not intended to limit the scope of the invention.

In FIG. 5.1, various software threads (i.e., software thread A (511), software thread B (512), and software thread C (513)) are shown collecting information on various network resources. In particular, the network resources includes various cross-connections (i.e., cross-connection A (541), cross-connection B (542), cross-connection C (543), cross-connection D (544), cross-connection E (545), cross-connection F (546), cross-connection G (547), cross-connection H (548), and cross-connection I (549)) and various links (i.e., link A (521), link B (522), link C (523), link D (524), link E (525), link F (526), link G (527), link H (528), link I (529), link J (530), link K (531), and link L (532)). In particular, software thread A (511) obtains cross-connection regarding the cross-connections (541, 542, 544, 545) and link information regarding the links (521, 523, 524, 526). On the other hand, software thread B (512) obtains cross-connection regarding the cross-connections (543, 546) and link information regarding the links (522, 525, 527). Furthermore, software thread C (513) obtains cross-connection regarding the cross-connections (547, 548, 549) and link information regarding the links (528, 529, 530, 531, 532). While FIG. 5.1 shows only one software thread obtaining cross-connection information and/or link information for each cross-connection and link, in some embodiments, there may be overlap where multiple software thread obtain information on the same network resource.

Keeping with FIG. 5.1, the link information for the links (521, 522, 523, 524, 525, 526, 527, 528, 529, 530, 531, 532) is stored in the links table (550), while the cross-connection information is stored in the cross-connections table (555).

Turning to FIG. 5.2, entries in a group-to-resources cache (591) and a trail-to-groups cache (592) are generated using data collected by the software threads (511, 512, 513). Various entries for the groups-to-resource cache (591) and the trail-to-groups cache (592) may be produced using the links table (550) and the cross-connections table (555), or directly by the software threads (511, 512, 513). In particular, the group-to resources cache (591) includes a group 1 (571) (i.e., cross-connection A (541), link A (521), and cross-connection B (542)), group 2 (572) (i.e., cross-connection B (542), link B (522), and cross-connection C (543)), group 3 (not shown) (i.e., cross-connection A (541), link C (523), and cross-connection D (544)), group 4 (not shown) (i.e., cross-connection B (542), link D (524), and cross-connection E (545)), group 5 (not shown) (i.e., cross-connection C (543), link E (525), and cross-connection F (546)), group 6 (not shown) (i.e., cross-connection D (544), link F (526), and cross-connection E (545)), group 7 (not shown) (i.e., cross-connection E (545), link G (527), and cross-connection F (546), group 8 (not shown) (i.e., cross-connection D (544), link H (528), and cross-connection G (547)), group 9 (not shown) (i.e., cross-connection E (545), link I (529), and cross-connection H (548)), group 10 (not shown) (i.e., cross-connection F (546), link J (530), and cross-connection I (546), group 11 (not shown) (i.e., cross-connection G (547), link K (531), and cross-connection H (548)), and group 12 (571) (i.e., cross-connection H (548), link L (532), and cross-connection I (549)).

Keeping with FIG. 5.2, the trail-to-groups cache (592) includes cross-connection A entry (561) (i.e., group 1 (571), group 3 (not shown)), cross-connection B entry (562) (i.e., group 1 (571), group 2 (572), and group 4 (not shown)), cross-connection C entry (not shown) (i.e., group 2 (572) and group 5 (not shown)), cross-connection D entry (not shown) (i.e., group 3 (not shown), group 6 (not shown), and group 8 (not shown)), cross-connection E entry (not shown) (i.e., group 4 (not shown), group 6 (not shown), group 7 (not shown), group 9 (not shown)), cross-connection F entry (562) (i.e., group 5 (not shown), group 7 (not shown), and group 10 (not shown)), cross-connection G entry (not shown) (i.e., group 8 (not shown) and group 11 (not shown)), cross-connection H entry (not shown) (i.e., group 9 (not shown), group 11 (not shown) and group 12 (579)), and cross-connection I Entry (569) (i.e., group 10 (not shown) and group 12 (579)).

Turning to FIG. 5.3, software thread D (514) proceeds to identify various end-to-end connections using the group-to-resources cache (591) and the trail-to-groups cache (592). In particular, the software thread D (514) identifies network resources for end-to-end connection A (581) that includes cross-connection A (541), cross-connection B (542), cross-connection C (543), cross-connection F (546), link A (521), link B (522), and link E (525). Additionally, the software thread D (514) identifies network resources for end-to-end connection B (582) that includes cross-connection G (547), cross-connection H (548), cross-connection I (549), link K (531), and link L (532).

Turning to FIG. 5.4, the software thread D (514) generates an end-to-end connection table (56) that includes the end-to-end connection A (571) and end-to-end connection B (572). Accordingly, multiple software threads (not shown) proceed to establish the end-to-end connection A (571) and end-to-end connection B (572) over the network.

Figure 6:
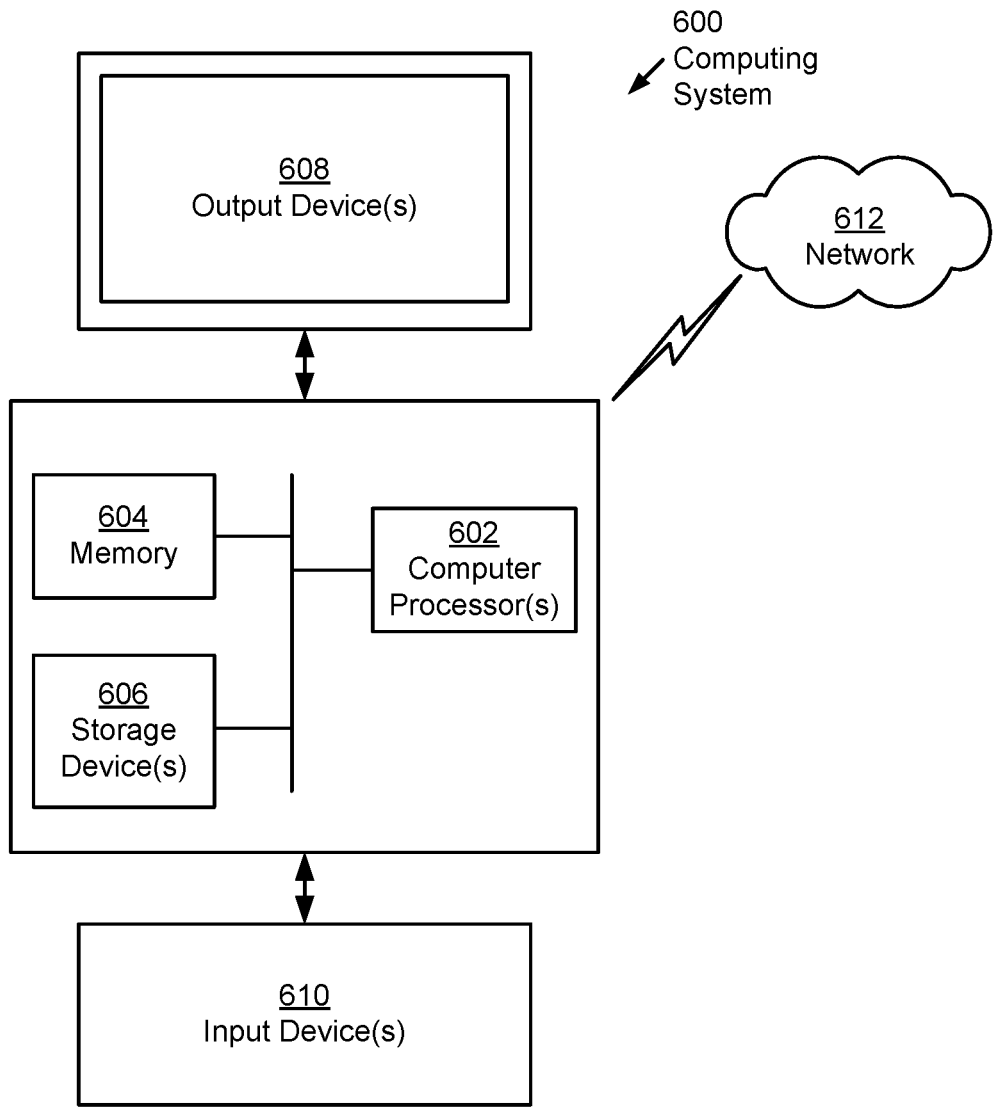
FIG. 6 shows a computing system in accordance with one or more embodiments.

Embodiments of the invention may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for connecting endpoints, comprising:
determining, using a first plurality of software threads, cross-connection information regarding a plurality of cross-connections among a plurality of hardware network elements, wherein the plurality of hardware network elements comprise a first hardware network element and a second hardware network element, and wherein the plurality of cross-connections correspond to layer terminations between different network layers among the plurality of hardware network elements;

determining, using the first plurality of software threads, link information regarding a plurality of links between the plurality of hardware network elements;

processing, within a network cache, the cross-connection information and the link information into a plurality of network resources groups, wherein each network resource group of the plurality of network resources groups describes a plurality of adjacent cross-connections for a link among the plurality of links; and establishing, using the plurality of network resources groups, a first end-to-end connection between the first hardware network element and the second hardware network element, and wherein the first end-to-end connection comprises at least one cross-connection among the plurality of cross-connections.

2. The method of claim 1, wherein the first end-to-end connection is identified using a software thread and the plurality of network resources groups.

3. The method of claim 2, wherein the first end-to-end connection is established using a second plurality of software threads.

4. The method of claim 3, further comprising:
identifying, using the software thread and from the cross-connection information and link information, a second end-to-end connection between a third hardware network element and a fourth hardware network element,
wherein the identification, by the software thread, of the second end-to-end connection is performed substantially simultaneously with the establishment, by the second plurality of software threads, of the first end-to-end connection.

5. The method of claim 3, wherein identifying the end-to-end connection comprises:
identifying a plurality of network resources for the end-to-end connection,
wherein the plurality of network resources comprises at least one cross-connection and at least one link between the first hardware network element and the second hardware network element.

6. The method of claim 3, wherein the second plurality of software threads are operated by a software-defined network controller located on a subset of network elements from the plurality of hardware network elements.

7. The method of claim 3, wherein the cross-connection information is obtained over a control plane before a data plane is implemented among the plurality of hardware network elements.

8. The method of claim 3, wherein the plurality of cross-connections comprise an optical cross-connect.

9. A system for connecting endpoints, comprising:
a plurality of hardware network elements comprising
a first hardware network element,
a second hardware network element, and
a plurality of cross-connections,
wherein the plurality of cross-connections correspond to layer terminations between different network layers among the plurality of hardware network elements, and
wherein the plurality of hardware network elements are configured to communicate with a control plane for establishing a plurality of end-to-end connections between the plurality of network elements; and
a software-defined network (SDN) controller, wherein the SDN controller is configured to determine, using a first plurality of software threads, cross-connection information regarding the plurality of cross-connections;

determine, using the first plurality of software threads, link information regarding a plurality of links between the plurality of hardware network elements; and process, within a network cache, the cross-connection information and the link information into a plurality of network resources groups, wherein each network resource group of the plurality of network resources groups describes a plurality of adjacent cross-connections for a link among the plurality of links; and establish, using the plurality of network resources groups, a first end-to-end connection between the first hardware network element and the second hardware network element, wherein the first end-to-end connection comprises at least one cross-connection among the plurality of cross-connections.

10. The system of claim 9, wherein the SDN controller is further configured to:
identify, using a software thread and the plurality of network resources groups, the first end-to-end connection.

11. The system of claim 10, wherein the SDN controller is further configured to:
establish, using a second plurality of software threads, the first end-to-end connection.

12. The system of claim 11, wherein the network cache is configured to:
store the cross-connection information and the link information,
wherein the software thread identifies the first end-to-end connection from data stored in the network cache.

13. The system of claim 11, wherein the SDN controller is further configured to:
identify, using the software thread and from the cross-connection information and link information, a second end-to-end connection between a third hardware network element to a fourth hardware network element,
wherein the identification, by the software thread, of the second end-to-end connection is performed substantially simultaneously with the establishment, by the second plurality of software threads, of the first end-to-end connection.

14. The system of claim 11, wherein the SDN controller is further configured to:
identify a plurality of network resources for the end-to-end connection,
wherein the plurality of network resources comprises at least one cross-connection and at least one link between the first hardware network element and the second hardware network element.

15. The system of claim 11, wherein the cross-connection information is obtained over the control plane before a data plane is implemented among the plurality of hardware network elements.

16. The system of claim 11, wherein the plurality of cross-connections comprises an optical cross-connect.

17. A non-transitory computer readable medium storing instructions for connecting endpoints, the instructions, when executed by a computer processor, comprising functionality for:
determining, using a first plurality of software threads, cross-connection information regarding a plurality of cross-connections among a plurality of hardware network elements, wherein the plurality of hardware network elements comprise a first hardware network element and a second hardware network element, wherein the plurality of cross-connections correspond to layer terminations between different network layers within a network;

determining, using the first plurality of software threads, link information regarding a plurality of links between the plurality of hardware network elements;

processing, within a network cache on the network, the cross-connection information and the link information into a plurality of network resources groups, wherein each network resource group of the plurality of network resources groups describes a plurality of adjacent cross-connections for a link among the plurality of links; and establishing, using the plurality of network resources groups, an end-to-end connection between the first hardware network element and the second hardware network element, and wherein the end-to-end connection comprises at least one cross-connection among the plurality of cross-connections.

18. The non-transitory computer readable medium of claim 17, wherein the instructions further comprise functionality for:

identifying, using a software thread and the plurality of network resources groups, the end-to-end connection.

19. The non-transitory computer readable medium of claim 18, wherein the instructions further comprise functionality for:

establishing, using a second plurality of software threads, the end-to-end connection.

20. The non-transitory computer readable medium of claim 19, wherein identifying the end-to-end connection comprises:

identifying a plurality of network resources for the end-to-end connection, wherein the plurality of network resources comprises at least one cross-connection and at least one link between the first hardware network element and the second hardware network element.

* * * * *